J. T. HAYNE.
RUNNING BOARD FOR AUTOMOBILES.
APPLICATION FILED APR. 26, 1919.

1,382,506.

Patented June 21, 1921.
2 SHEETS—SHEET 1.

Inventor,
John T. Hayne
By C. F. Belk
Atty.

J. T. HAYNE.
RUNNING BOARD FOR AUTOMOBILES.
APPLICATION FILED APR. 26, 1919.

1,382,506.

Patented June 21, 1921.
2 SHEETS—SHEET 2.

Inventor,
John T. Hayne
By C. T. Belt
Atty.

UNITED STATES PATENT OFFICE.

JOHN T. HAYNE, OF DETROIT, MICHIGAN.

RUNNING-BOARD FOR AUTOMOBILES.

1,382,506.

Specification of Letters Patent.   Patented June 21, 1921.

Application filed April 26, 1919.   Serial No. 292,823.

*To all whom it may concern:*

Be it known that I, JOHN T. HAYNE, a citizen of the United States, residing at Detroit, in the county of Wayne and State of Michigan, have invented certain new and useful Improvements in Running-Boards for Automobiles, of which the following is a specification.

This invention relates to running-boards of automobiles and pertains especially to tread surfaces adapted to be applied to and form a component part of running-boards for automobiles.

The object of the invention is to provide a method of manufacturing automobile running-boards having the tread member or mat pressed into or otherwise made to be self-retaining with respect to the body of such boards.

A further object of the invention is to provide an automobile running-board, the tread member of which shall be self-retaining, and which shall afford special means for uniting with the board so as to form a component part thereof in the production of complete tread surface boards.

A still further object of the invention is to provide a running-board tread surface having a plurality of contiguous sections or members of different depth or thickness, and to embody in certain of said sections scraping members of different material than that of the board or that of the tread surface. Ordinarily the tread surfaces of such boards constitute a ribbed mat, all of the ribs being in the same plane, removably attached to and extending the length of the board, and it is not unusual to removably attach individual tread plates to such mats opposite the doors of an automobile, the plate ribs being elevated above the mat surface. Such attachments are usually made by tacking, screwing, and edge binding first the mat to the board and then, by similar means, securing the tread plates to the mats, but according to my invention these appliances and means of attachments are unnecessary for the reason that, I make a mat with alternate tread surfaces of different relative elevations or height all in one piece of material and by the same operation press or embed portions of such mat material into the boards so as to interlock with the board and thereby produce a complete board with the tread surfaces forming a component part thereof in manufacture and application, and to the avoidance of separate mats and separate plate treads.

In the accompanying drawings forming part of this application:—

The same reference characters denote the same parts throughout the several views of the drawings.

Figure 1:
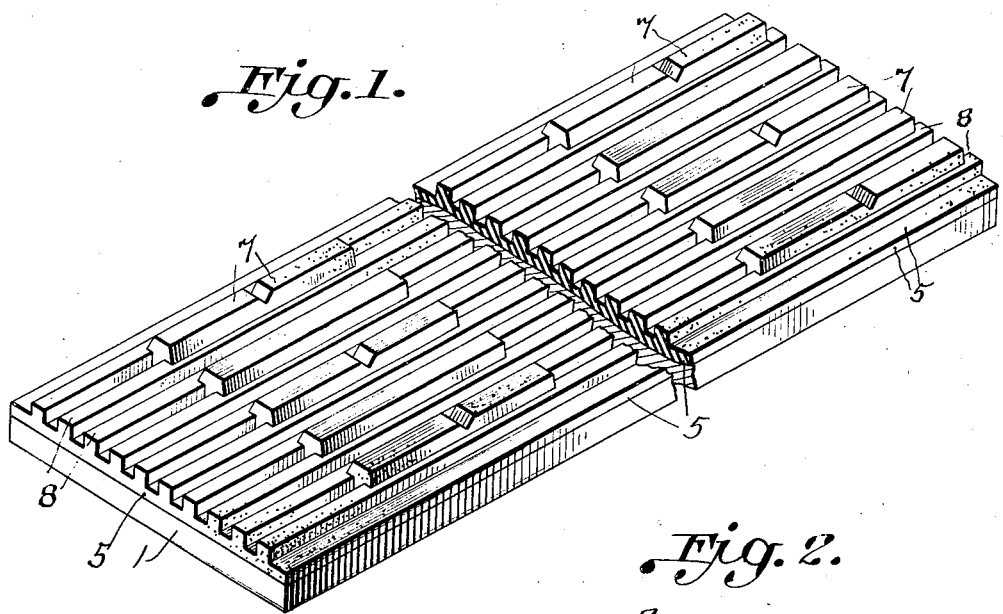
Figure 1 is a perspective view of a running-board embodying my invention as applied to an automobile.
Figure 2:
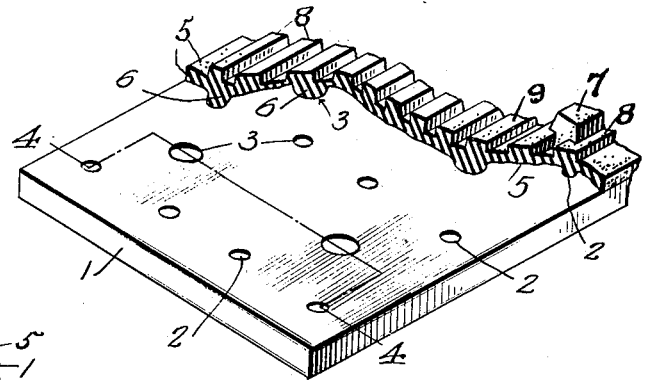
Fig. 2 is a perspective view showing part of a mat as formed and rolled-pressed into a board by one and the same operation.
Figure 3:
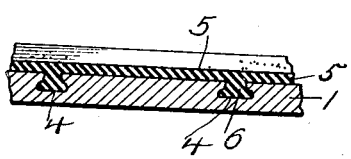
Fig. 3 is a longitudinal section.
Figure 4:
Fig. 4 is a cross section on the line 4—4 Fig. 2 with the mat impressed into the board.

In carrying out my invention, I employ a body base board member 1 preferably of wood, but other material may be found to answer the same purpose, and this board may be cut or shaped to fit any of the running board frames or supports of various automobiles preparatory to molding the mat thereon. The base board or member 1 has a plurality of circular cavities 2 and 3 made in the upper or mat-holding face thereof, and these cavities have an undercut inner base or bottom 4, the purpose of which will be hereinafter disclosed. The sheet 5 for the mats is preferably composed of linoleum, or it may be formed in whole or in part of rubber or like material, and applied to the base board 1, in such pliable or soft condition as to be pressed upon the boards preferably by a suitable roller or die having corrugations for forming the outer surface of said sheet into sets or sections of tread ribs while part of the sheet is being pressed into the cavities 2 by the same operation of the roller or die. Such operation will result in an interlock between the cavity undercuts 3 and the mat protrusions 6. Such pressed interlocks, according to my invention, constitute the only means for fixing or joining the mats and the base boards together so that the mat becomes a component part of the board. The cavities 2 are preferably formed adjacent to the edges of the base board, and the cavities 3 are scattered throughout the mat face of the board so as to prevent the mat from buckling.

Figure 5:
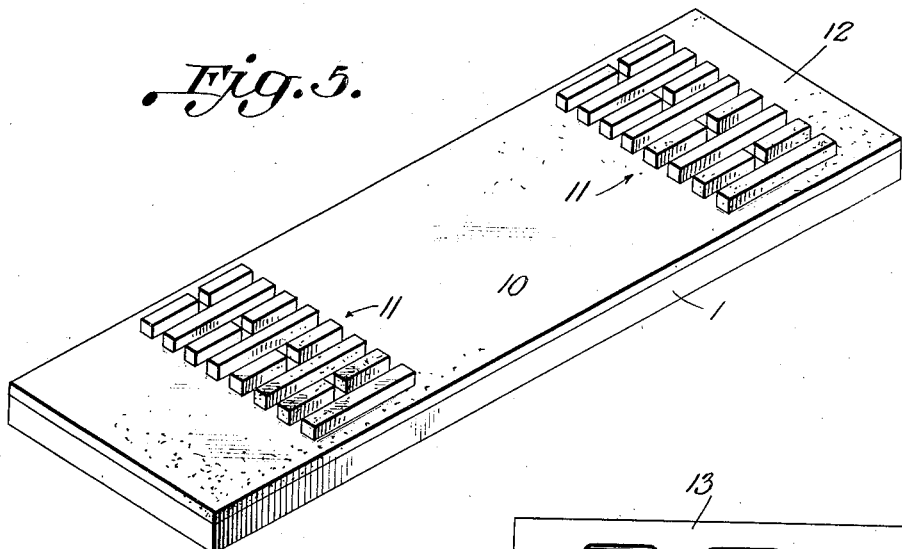
Fig. 5 is a perspective view showing a modified tread surface.

The tread surface of the mat comprises a plurality of rib-sections forming upper and lower tread ribs, the ribs 7 of the upper section are raised or elevated with respect to the plane of the ribs 8 of the lower section, and the shank portions of the ribs 7 are contained intermediately between the ribs 8 comprising the lower section, so that the upper ribs partially over-lap the face surface of certain of the lower ribs. This ribbed tread surface may have many modified forms of relative arrangement, for example, as shown in Fig. 5, a central flat or unribbed surface 10 occupies the space between the ribbed sections 11, and the ends of this mat have flat surfaces 12, but the same arrangement, as hereinbefore described, of alternating short and long ribs, is carried out in the sections 11.

Figure 6:
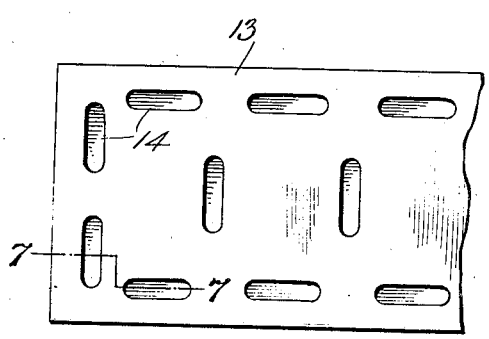
Fig. 6 is a top view of part of a board body showing modified mat-locking cavities.
Figure 7:
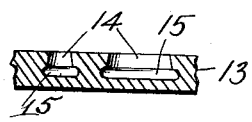
Fig. 7 shows certain of the cavities shown in Fig. 6, in sectional view taken on the line 7—7.

Referring to the modification shown in Figs. 6 and 7 of the drawings, the base board 13 has elongated cavities 14, one set of which extends lengthwise and the other set crosswise of the base board, and these cavities are dove-tailed or have inwardly beveled walls terminating in an interlocking undercut 15. This arrangement and shape of cavities affords greater holding strength between the mat and the board.

Figure 8:
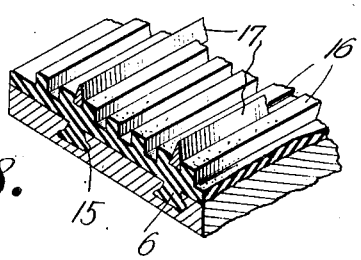
Fig. 8 is a sectional perspective view of a further modification.

Referring to Fig. 8 of the drawings, certain of the ribs as 16, have a foot-scraping member or blade as 17 embedded therebetween in the manufacture thereof.

It will be seen that the mats may be formed on and pressed into the base boards from a blank sheet of linoleum or the like of sufficient thickness and pliable condition as to constitute a permanent and component part of the base boards, and thereby affords a complete article as an automobile running-board of great durability, and without the necessity of gluing, metallic fastenings, or other usual securing devices for joining the mat to the base board.

Obviously the operation of pressing the mat onto the base boards and at the same time forming the rib tread surfaces in the mat, lessens the cost and expedites the production of complete running-boards in such shape and condition as to be expeditiously applied to automobiles.

I do not wish to confine myself to any particular size, shape, and material, nor to any particular press or die device, nor the application of the invention to any particular automobile, but reserve the right to make such changes and variations in the manufacture and practical application of the invention as may not be inconsistent with the appended claims.

Having thus described my invention what I claim as new and desire to secure by Letters Patent is:—

A running board for automobiles, including a base board and a resilient pliable mat having its upper or tread surface provided with upper and lower sets of tread-ribs, the upper set of ribs having their shank-portions received intermediately of the lower set of ribs and their upper tread-surfaces partially overlying the upper surfaces of said lower set of ribs, said baseboard and mat being provided with means adapted to effect an interlocking connection therebetween.

In witness whereof I hereunto set my hand in the presence of two witnesses.

JOHN T. HAYNE.

Witnesses:
HENRY WOELFLE,
ANNA MERSINO.